US005329446A

United States Patent [19]

Kugimiya et al.

[11] Patent Number: 5,329,446

[45] Date of Patent: Jul. 12, 1994

[54] TRANSLATION MACHINE

[75] Inventors: Shuzo Kugimiya; Hitoshi Suzuki, both of Nara; Yoji Fukumochi, Ikoma; Ichiko Sata, Nara; Tokuyuki Hirai, Yamato-Koriyama, all of Japan

[73] Assignee: Sharp Kabushiki Kaisha, Osaka, Japan

[21] Appl. No.: 641,732

[22] Filed: Jan. 14, 1991

[30] Foreign Application Priority Data

| | | | |
|---|---|---|---|
| Jan. 19, 1990 | [JP] | Japan | 2-11053 |
| Jan. 23, 1990 | [JP] | Japan | 2-13018 |
| Jan. 26, 1990 | [JP] | Japan | 2-17118 |

[51] Int. Cl.[5] .......... G06F 15/38

[52] U.S. Cl. .......... 364/419.04

[58] Field of Search .......... 364/419, 419.02, 419.04, 364/419.05

[56] References Cited

U.S. PATENT DOCUMENTS

| | | | |
|---|---|---|---|
| 4,685,060 | 8/1987 | Yamano et al. | 364/419 |
| 4,706,212 | 11/1987 | Toma | 364/900 |
| 4,791,587 | 12/1988 | Doi | 364/900 |
| 4,814,988 | 3/1989 | Shiotani et al. | 364/419 |
| 4,821,230 | 4/1989 | Kumano et al. | 364/900 |
| 4,887,212 | 12/1989 | Zamora et al. | 364/419 |
| 4,931,936 | 6/1990 | Kugimiya et al. | 364/419 |
| 4,953,088 | 8/1990 | Suzuki et al. | 364/419 |
| 4,962,452 | 10/1990 | Nogami et al. | 364/419 |
| 4,964,077 | 10/1990 | Eisen et al. | 364/900 |
| 5,005,127 | 4/1991 | Kugimiya et al. | 364/419 |
| 5,010,486 | 4/1991 | Suzuki et al. | 364/419 |
| 5,136,503 | 8/1992 | Takagi et al. | 364/419 |

FOREIGN PATENT DOCUMENTS

| | | |
|---|---|---|
| 0168814 | 1/1986 | European Pat. Off. . |
| 0199464 | 10/1986 | European Pat. Off. . |
| 0274281 | 7/1988 | European Pat. Off. . |
| 0403057 | 12/1990 | European Pat. Off. . |
| 57-69362 | 4/1982 | Japan . |
| 61-18074 | 1/1986 | Japan . |
| 61-74069 | 4/1986 | Japan . |
| 62-271057 | 11/1987 | Japan . |
| 63-221475 | 9/1988 | Japan . |
| 1-166258 | 6/1989 | Japan . |
| 1-233560 | 6/1989 | Japan . |

*Primary Examiner*—Roy N. Envall, Jr.
*Assistant Examiner*—Xuong Chung
*Attorney, Agent, or Firm*—Nixon & Vanderhye

[57] ABSTRACT

A translation machine capable of translating one or more sentences described in a source language into a target language, the translation machine having a storing unit which stores dictionaries and predetermined rules, the translation machine includes unit for dividing a sentence described in the source language into morphologic elements so as to analyze a syntax structure of each of the morphologic elements in accordance with the dictionaries and the predetermined rules, a unit connected to the dividing unit for converting the syntax structure of the source language into a syntax structure of the target language so as to generate a translated sentence in the target language on a basis of the syntax structure of the target language, and a unit connected to the converting unit for moduling a result of the translated sentence generated by the generating unit so as to create a user dictionary.

10 Claims, 13 Drawing Sheets

*Fig. 5*

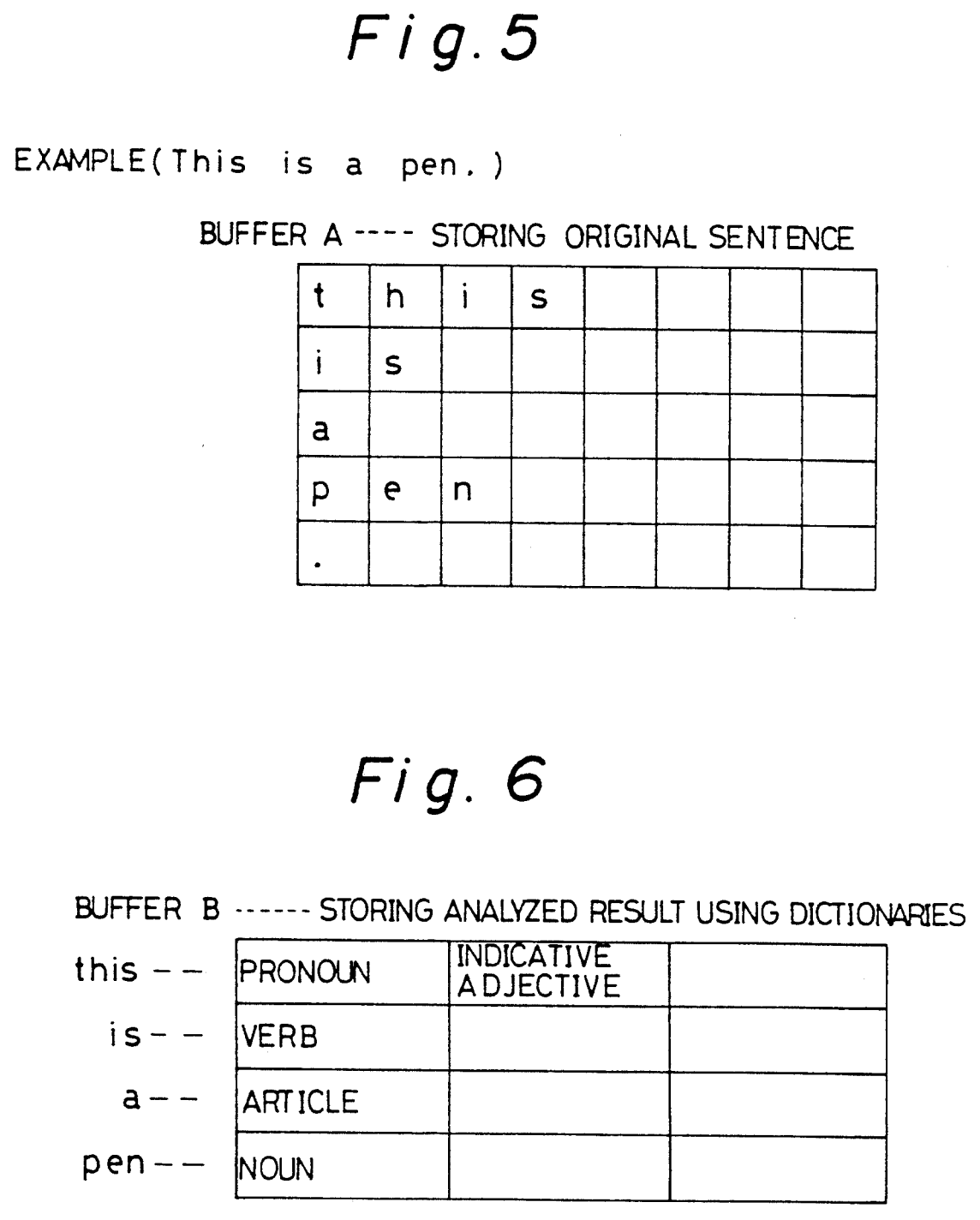

EXAMPLE(This is a pen.)

BUFFER A ---- STORING ORIGINAL SENTENCE

| | | | | | | | |
|---|---|---|---|---|---|---|---|
| t | h | i | s | | | | |
| i | s | | | | | | |
| a | | | | | | | |
| p | e | n | | | | | |
| . | | | | | | | |

*Fig. 6*

BUFFER B ------ STORING ANALYZED RESULT USING DICTIONARIES

| | | | |
|---|---|---|---|
| this -- | PRONOUN | INDICATIVE ADJECTIVE | |
| is -- | VERB | | |
| a -- | ARTICLE | | |
| pen -- | NOUN | | |

USER DICTIONARY REGISTERATION

ENGLISH
WORD(S) Sharp Information Systems Laboratories
  PART OF SPEECH   NOUN

JAPANESE EQUIVALENT  **

PART OF SPEECH   NOUN

USER DICTIONARY REGISTERATION

ENGLISH
WORD(S) Sharp Infomation Systems Laboratories
  PART OF SPEECH   NOUN

JAPANESE
EQUIVALENT  Sharp Information Systems Laboratories
  PART OF SPEECH   NOUN

TRANSLATION MACHINE

BACKGROUND OF THE INVENTION

1. Field of the Invention

The present invention relates to a translation machine which can generate a natural translated sentence. More particularly, the invention relates to the translation machine which is capable of changing an interface with a user depending on the user's setting.

2. Description of the Related Arts

The inventors of the present invention know that there have been traditionally proposed translation machines. Of those machines, a typical translation machine mainly includes a CPU, a translation module, and storage units for storing a main dictionary, a user dictionary, grammatical rules and tree-structure converting rules. In operation, the typical translation machine takes the steps of entering a source language input from a keyboard into a translation module under the control of the CPU and translating the source language into a target language in the translation module using the main and user dictionaries and the grammatical and tree-structure converting rules in respective storage units.

When the translation machine is in operation for translating English into Japanese, for example, a user often needs to register a new English word uniquely created in the user dictionary. For registering a new word, the word has to be input together with the information of Title of the English Word, Part of Speech of the English Word, Inflection (Conjugation) of the English Word, Japanese Equivalent of the English Word, Part of Speech of the Japanese Equivalent and Inflection (Conjugation) of the Japanese Equivalent.

As mentioned above, for generating a more natural translation sentence, it is necessary to register in the user dictionary not only the English word and its Japanese equivalent but also each part of speech and inflection of the English word and the Japanese equivalent.

When of registering a new English word in the user dictionary, a use is required to input the inflection (conjugation) of an equivalent Japanese word to the English word. Therefore the user has to have a knowledge about Japanese grammar. It brings about a disadvantage that users except those having the knowledge about the Japanese grammar cannot easily and efficiently create the user dictionary.

Further, the foregoing translation machine has another disadvantage. When the translation machine is in operation for translating English into Japanese, for example, at first, the translation machine divides the input English sentence into words and obtains the grammatical information about each word and its Japanese equivalent by consulting the dictionaries stored in the memory. As mentioned above, the typical translation machine has the user dictionary in which a user can register new words in addition to the basic and special dictionaries. The user dictionary contains not only the English word itself but also the information about the English word such as a title, a part of speech, its Japanese equivalent, and a part of speech of the Japanese equivalent.

Assume that the foregoing translation machine translates a sentence including the proper-noun phrase "Sharp Information Systems Laboratories" into Japanese. It may analyze the proper-noun phrase word by word without treating it as one phrase. Or, it may merely translate the part of the phase using the words registered in the dictionaries. In any event, if the proper-noun phase is not treated as one phrase in operation of the translation, the resulting translated sentence becomes unclear.

To overcome the disadvantage, such a proper-noun phrase is registered as a block of words in the user dictionary. However, disadvantageously, the Japanese equivalent to each word cannot be uniquely specified.

Such a specific proper-noun phrase may be registered as one block in the user dictionary so that its Japanese equivalent is the same phrase. In this case, the proper-noun phrase is left intact in the Japanese translated sentence, because it is analyzed as one block. In registering the long proper-noun phrase title like "Sharp Information Systems Laboratories", however, an operator has a large burden, because the operator has to make sure the long phrase title, character by character, for avoiding erroneous registration.

In turn, a further disadvantage of the foregoing normal translation machine will be described hereinafter. The normal translation machine is so arranged that it performs a translation without considering how much a user knows about the source language and the target language or the translation machine itself. However, a user having little knowledge about the languages or skill about the operation of the translation machine cannot make full use of the functions of the translation machine.

SUMMARY OF THE INVENTION

It is therefore a first object of the present invention to provide a translation machine which allows any user to easily and efficiently create a user dictionary.

The object of the present invention can be achieved by a translation machine capable of translating one or more sentences described in a source language into a target language, the translation machine having a storing unit which stores dictionaries and predetermined rules includes a unit for dividing a sentence described in the source language into morphologic elements so as to analyze a syntax structure of each of the morphologic elements in accordance with the dictionaries and the predetermined rules, a unit connected to the dividing unit for converting the syntax structure of the source language into a syntax structure of the target language so as to generate a translated sentence in the target language on a basis of the syntax structure of the target language, and a unit connected to the converting unit for moduling a result of the translated sentence generated by the generating unit so as to create a user dictionary.

Preferably, the dividing unit includes a unit for determining whether or not a part of the characters matches with a predetermined character, the characters composing the translated sentence being equivalent to a word in the source language registered in the user dictionary.

More preferably, the dividing unit further includes a unit for presuming a conjugation of the translated sentence on a basis of a determined result by using the predetermined rules and for registering the presumed result in the user dictionary.

Further preferably, the moduling unit includes a unit for analyzing a meaning of the sentence and for checking a proper meaning thereof on a basis of a syntax analyzed result obtained by the analyzing unit.

The moduling unit further includes a unit for analyzing a context of the sentence so that an abbreviation and an ambiguity of the sentence are removed therefrom, preferably.

The meaning analyzing unit is a translation program, and the context analyzing unit is a translation CPU with a plurality of buffers, preferably.

The plurality of buffers preferably include five buffers, a first buffer thereof is adapted to store the sentence, a second buffer thereof is adapted to store the analyzed result of the sentence given by the dividing unit, a third buffer thereof is adapted to store a structure analyzed tree of the sentence given by the analyzing unit, a fourth buffer thereof is adapted to store the syntax converted result given by the converting unit, and a fifth buffer thereof is adapted to store the translated sentence given by the generating unit in accordance with the translation program which is controlled by the translation CPU.

Preferably, each of the morphologic elements has an information which includes a title, a part of speech, an inflection and a translated sentence equivalent to each of the morphologic elements, and a part of speech and an inflection of the translated sentence.

The source language is English and the target language is Japanese, preferably.

In operation, the translation machine designed according to the first aspect of the invention works as follows.

When a source-language sentence is input to a dividing unit, the input sentence is divided into morphological element series for obtaining its target-language equivalent to each morphological element. Then, the dividing unit also analyzes the syntax consisting of the morphological element series. The syntax structure analyzed by the dividing unit is sent to a converting unit in which the syntax structure is converted into the corresponding target-language syntax structure. Then the corresponding target-language sentence is generated depending on the target-language syntax structure.

When a new word is registered in the user dictionary used in the dividing unit, the target-language equivalent to the new word is input together. The determining unit determines whether or not a character located at a proper spot of the character series composing the target-language equivalent is a pre-specified one. Then, based on the determining result output by the determining unit, the translated word inflection presuming and registering unit serves to presume the inflection of the translated word depending on the predetermined rules and registers the presumed result in the user dictionary.

As such, when a user registers a new word in the user dictionary, the inflection of the Japanese equivalent to the word is allowed to be automatically presumed and registered in the user dictionary. It results in even a user having no knowledge about the target-language grammar being able to register the inflection of the target-language equivalent easily and efficiently.

It is a second object of the present invention to provide a translation machine which makes it possible to easily create a user dictionary from which the title of the source-language word or phase is allowed to be output as a target-language equivalent to a specific registered word or phase.

The second object of the present invention can be achieved by a translation machine capable of translating one or more sentences described in a source language into a target language, the translation machine having a translation module linked with a storing unit which stores dictionaries, a user dictionary, grammatical rules and tree structure converting rules includes a unit for dividing a sentence described in the source language into morphologic elements so as to obtain information of each of the morphologic elements in accordance with the dictionaries and the user dictionary, a unit connected to the dividing unit for analyzing a syntax structure of each of the morphologic elements obtained by the dividing unit in accordance with the dictionaries and the grammatical rules, a unit connected to the analyzing unit for converting the syntax structure obtained by the analyzing unit into a syntax structure of the target language, and a unit connected to the converting unit for generating a translated sentence in the target language on a basis of the syntax structure of the target language obtained by the converting unit.

Preferably, the dividing unit includes a unit for determining whether or not a predetermined symbol is assigned to the translated sentence to a title of each of the morphologic elements in accordance with the user dictionary.

More preferably, the dividing unit further includes a unit for outputting the title of each of the morphologic elements as the translated sentence in a case that the predetermined symbol is assigned as the translated sentence equivalent to each of the morphological elements.

The translation machine designed according to the second aspect of the invention works as follows.

When a source-language sentence is input to the dividing unit, the sentence is divided into morphologic element series. It results in obtaining the part of speech and the translated equivalent of each divided morphologic element from the dictionaries containing the user dictionary. Then, the following process will be performed.

The determining unit determines whether or not a predetermined symbol is registered as the translated equivalent to the title of the morphologic element to be retrieved in the user dictionary. If the predetermined symbol is registered, the output unit serves to output the title of the morphologic element as the translated equivalent.

Then, the analyzing unit serves to analyze the syntax of the morphologic element series divided by the dividing unit. The analyzed structure of the syntax is converted into the structure of the syntax of the target language in the converting unit. And, the generating unit serves to generate the translated sentence based on the syntax structure of the target language with the translated equivalent of each morphologic element given by the dividing unit.

If the title of the translated equivalent to the morphologic element to be retrieved has the predetermined symbol, the title of the morphologic element is output as its translated equivalent. With a simple symbol for the predetermined symbol, it is possible to eliminate the necessity of inputting the title of the morphologic element as its translated equivalent in the user dictionary making sure of the title character by character, which places a large burden on an operator. It results in allowing a user to easily and efficiently register a specific morphologic element whose title is required to be output as its translated equivalent. This function is particularly effective in registering a long word or phrase required to output the same as its translated equivalent.

It is a third object of the present invention to provide a translation machine which can properly adjust the interface with a user in accordance with the skill of a user.

The third object of the present invention can be achieved by a translation machine capable of translating one or more sentences described in a source language and outputting the translated sentences in a target language by an interface with a user, the translation machine having an translation module linked with a storing unit which stores dictionaries, a user dictionary, grammatical rules and tree structure converting rules, the translation machine includes a unit for dividing a sentence described in the source language into morphologic elements so as to obtain information of each of the morphologic elements in accordance with the dictionaries and the user dictionary, a unit for analyzing a syntax structure of each of the morphologic elements obtained by the dividing unit in accordance with the dictionaries and the grammatical rules, a unit for converting the syntax structure obtained by the analyzing unit into a syntax structure of the target language, a unit for generating a translated sentence in the target language on a basis of the syntax structure of the target language obtained by the converting unit, a unit for setting a user level in accordance with a knowledge of the source language and the target language, and a skill of operation of the translation machine, and a unit for controlling a change of the interaction in accordance with the user level set by the setting unit.

Preferably, the user level is divided into two or more degrees in accordance with the knowledge and the skill.

More preferably, the setting unit and the control unit are adapted to be functioned at a time when one or more new words are registered in the user dictionary.

The translation machine designed according to the third aspect of the invention works as follows.

At first, a user sets a proper level based on his or her knowledge about the source and target languages and skill about the operation of the translation machine. Then, the translation machine changes a process of translation based on the set user level as taking an interface with a user.

It results that the translation machine is enabled to output a more proper translated equivalent and be smoothly handled even by a beginner for the machine, thereby it makes possible to access for many users.

Further objects and advantages of the present invention will be apparent form the following description of the preferred embodiments of the invention as illustrated in the accompanying drawings.

BRIEF DESCRIPTION OF THE DRAWINGS

FIG. 5 to 9 are views showing the content of each buffer included in the translation module;

DESCRIPTION OF THE PREFERRED EMBODIMENTS

Hereinafter, a first embodiment of the invention will be described in detail.

Figure 1:
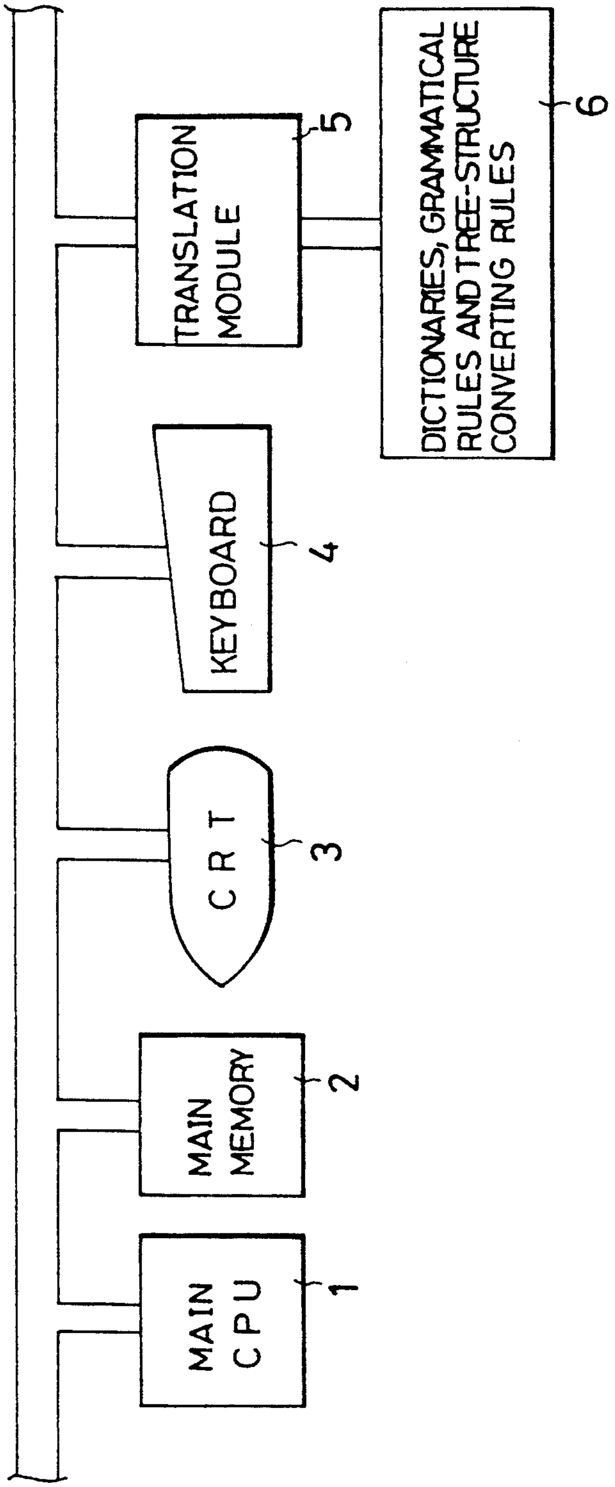
FIG. 1 is a block diagram showing arrangement of a translation machine designed according to a first embodiment of the invention.

FIG. 1 is a block diagram showing a first embodiment of the translation machine according to the present invention. 1 denotes a main CPU, 2 denotes a main memory, 3 denotes a CRT (Cathode-Ray Tube), 4 denotes a keyboard, 5 denotes a translation module, and 6 denotes a memory which stores translation dictionaries such as a main dictionary and a user dictionary, as well as grammatical rules and tree-structure converting rules.

The translation module 5 serves to translate a sentence described in a source language (English in this embodiment) into a target-language (Japanese) sentence and output the resulting sentence. That is, the source language is input from the keyboard 4 and is sent to the translation module 5 under the control of the main CPU 1. The translation module 5 translates the source language into the target language using the dictionaries, the grammatical rules and the tree-structure converting rules stored in the memory 6. A process of translation in the translation module 5 will be described later. Then the translated result is temporarily stored in the main memory 2 and displayed on the CRT 3.

Figure 2:
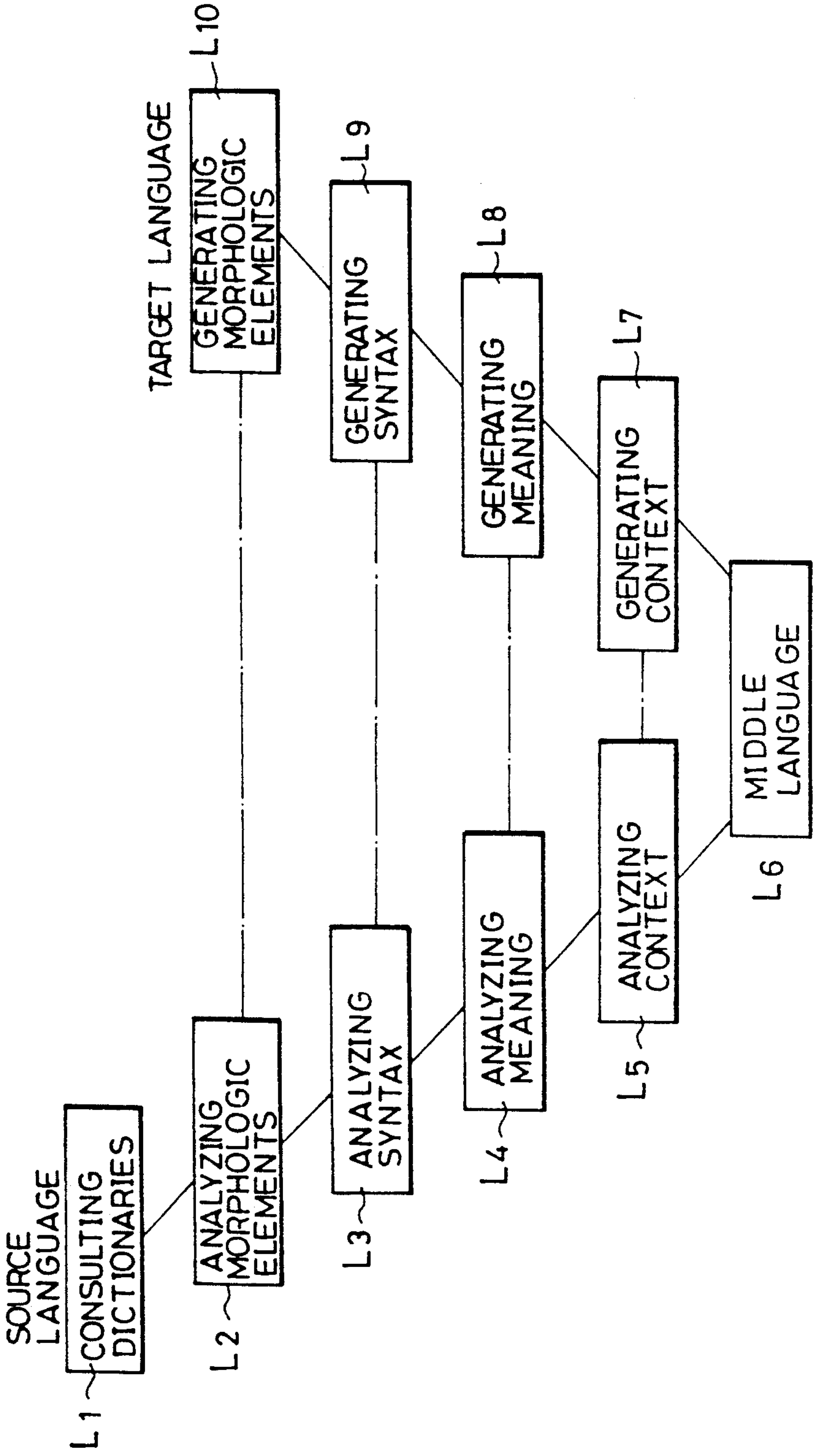
FIG. 2 is a view illustrating translation levels stepped in machine translation.

The automatic translation executed in the translation module 5 has some analysis levels as shown in FIG. 2. As shown, the source language is input at the upper left portion of the FIG. 2. The source language progresses a level $L_1$ of dictionary -consulting, a level $L_2$ of morphologic element analysis, a level $L_3$ of syntax analysis, and so forth in sequence. As passing to a higher level, the source language is further analyzed.

The machine translation is largely divided into two types based on the analysis level. One type is termed as a pivot system. The pivot system is designed to progressively analyze the source language to the level $L_6$ (middle language) irrelevant to both the source language and the target language and then to progress the middle language to a level $L_7$ of context generation, a level $L_8$ of meaning generation, a level $L_9$ of syntax generation, and a level $L_{10}$ of morphologic element generation for progressively generating the target language.

The other type is termed as a transfer system. The transfer system is designed to progress the analysis to any one of the level $L_2$ of morphologic element analysis, the level $L_3$ of syntax analysis, the level $L_4$ of meaning analysis, and the level $L_5$ of context analysis in order to obtain the inner structure of the source language at the reached level and then to convert the inner structure of the source language at the reached analyzed level into the corresponding inner structure of the target language, thereafter progressing to generation of the target language.

Herein after, the aforementioned analysis will be described.

Dictionary-consulting and morphologic element analysis
: Dividing the input sentence into each morphologic element series (each word), analyzing each word for obtaining the grammatical information such as a part of speech and the Japanese equivalent and further analyzing a tense, a person, a number and so forth.

Syntax analysis
: Defining the structure of each sentence (structure-analyzing tree) such as how words are related by the below-mentioned method.

Meaning analysis
: Determining if the Japanese equivalent word is properly used in light of the meaning based on the syntaxanalyzed results.

Context analysis
: Understanding meanings of the sentences for removing abbreviation and ambiguity.

Figure 3:
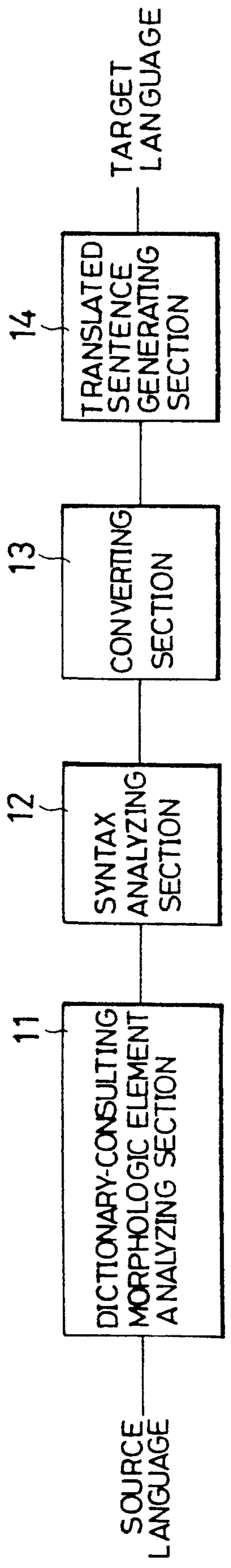
FIG. 3 is a diagram showing functional arrangement of a translation module included in the translation machine.

The translation module 5 employed in the present embodiment is so assumed that the last progressive level is the level $L_3$ of syntax analysis. As such, as shown in FIG. 3, the translation module 5 according to the embodiment consists of a dictionary-consulting morphologic element analyzing section 11, a syntax analyzing section 12, a converting section 13, and a translated sentence generating section 14.

Figure 4:
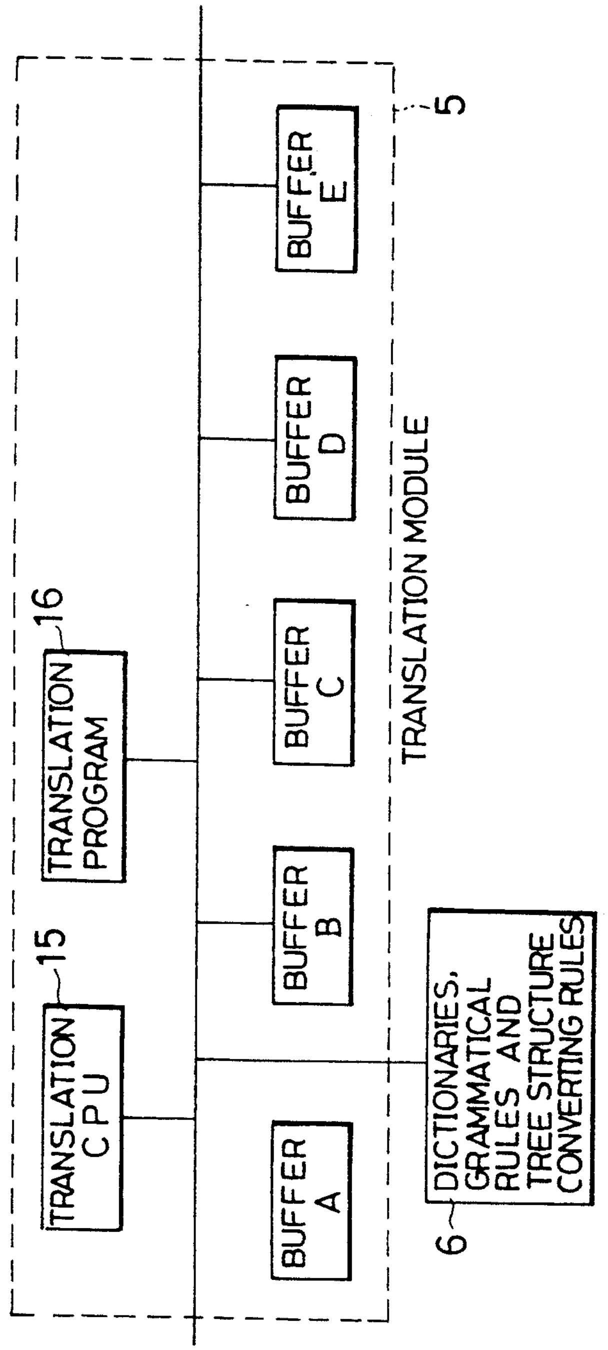
FIG. 4 is a block diagram showing constructional arrangement of the translation module.

FIG. 4 is a block diagram showing the translation module 5. FIGS. 5 to 9 illustrate each content of buffers A to E shown in FIG. 4 when translating an English sentence "This is a pen" into the corresponding Japanese sentence.

A process of translating the English sentence into the Japanese sentence will be described in the below with reference to FIGS. 3 to 9.

Figure 7:
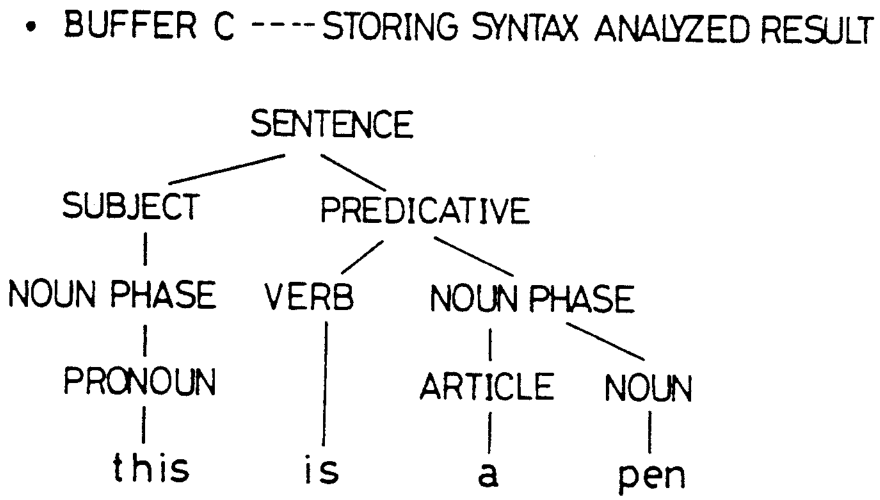
Figure 8:
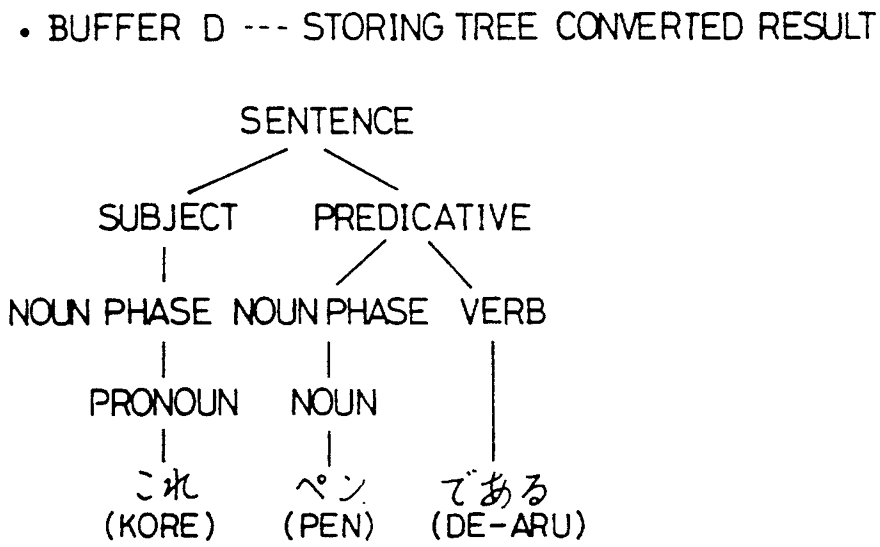

At first, an original sentence which is just read is stored in the buffer A as shown in FIG. 5. Then, based on a translation program 16, under the control of a translation CPU 15, the information about each word included in the original sentence stored in the buffer A is obtained by consulting the dictionaries stored in the memory 6 and the obtained information is stored in the buffer B (matching to the dictionary-consulting morphologic element analysis done in the dictionary-consulting morphologic element analyzing section 11 shown in FIG. 3). As a result, the information about a part of speech, which matches to a part of the overall information, is stored in the buffer B in a manner shown in FIG. 6. The word "this" corresponds to several parts of speech. Herein, it is uniquely defined as follows. The structure-analyzing tree which indicates a relation of the words to one another is defined as shown in FIG. 7 in accordance with the dictionaries and grammatical rules stored in the memory 6. Then, the tree is stored in the buffer C shown in FIG. 4. The buffer C matches to the syntax analysis done in the syntax analyzing section 12. The structure-analyzing tree is defined on the grammatical rules stored in the memory 6. That is, the grammatical rules indicate the structure of the subject sentence as follows:

Sentence→the subject and the predicative
Subject→the noun phase
Predicate→the verb and the noun phase
Noun phase→the pronoun
Noun phase→the article and the noun One of the grammatical rules describes "a sentence consists of a subject and a predicate". Based on such grammatical rules, the structure-analyzing tree is progressively defined.

Figure 9:
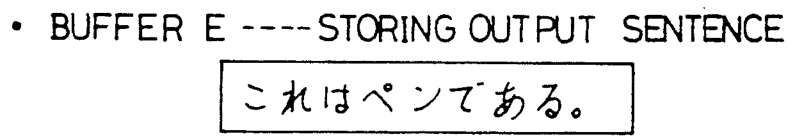

Like the foregoing syntax analysis, with the tree-structure converting rules stored in the memory 6, the structure of the syntax-analyzing tree (see FIG. 7) for the input English sentence is converted into the structure for the Japanese sentence. The converted result is stored in the buffer D shown in FIG. 4. It corresponds to the syntax conversion done in the converting section 13 shown in FIG. 3. finally, the translated Japanese sentence "これペンである。(kore·pen·dearu)" obtains a proper particle "は (Wa)" or an auxiliary verb. Then, the resulting Japanese sentence shown in FIG. 9 is stored in the buffer E. This final output sentence "これはペンである。(kore·wa·pen·dearu)" is output from the translation module 5 to the main memory 2 and to the CRT 3 in which it is displayed.

In the foregoing translation processing, for consulting the dictionary and analyzing morphologic elements, two dictionaries are provided, one is for a main dictionary including words input therein and the other is for a user dictionary in which a user can register words excluded in the main dictionary as required. When the user registers a new English word and its Japanese equivalent in the user dictionary, the translation CPU 15 executes the user-dictionary registering procedure.

Figure 10:
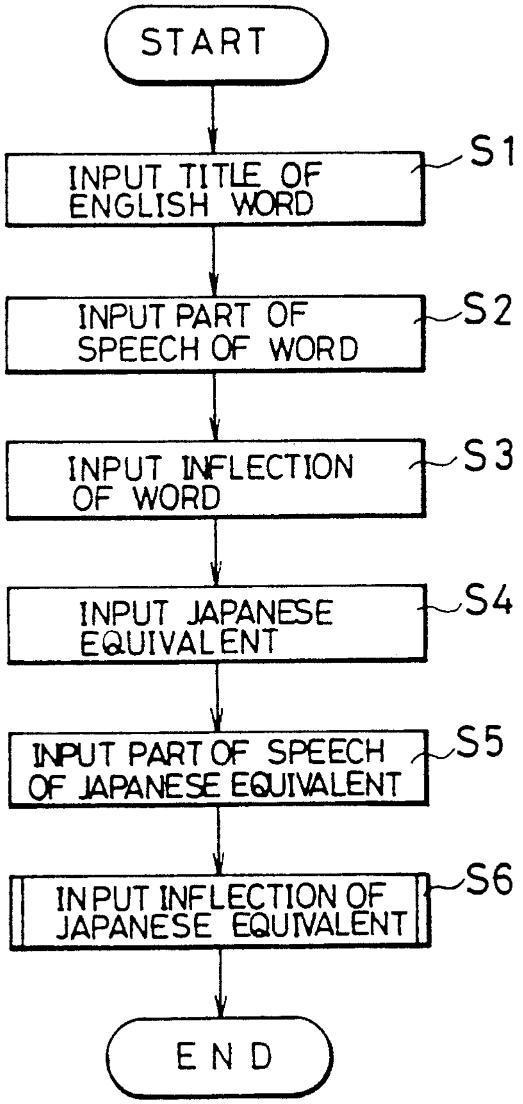
FIG. 10 is a flowchart showing how a word is registered in a user dictionary.

FIG. 10 is a flowchart showing a process of registering a new word in the user dictionary under the control of the translation CPU 15. The process of registering a new word will be described in detail with reference to FIG. 10.

At a step S1, the user inputs a title of an English word to be registered in the user dictionary. The word is registered in the dictionary.

At a step S2, the user inputs the part of speech of the English word to the user dictionary. It is registered therein.

At a step S3, the user inputs the inflection of the English word to the user dictionary. It is registered therein.

At a step S4, the user inputs the Japanese equivalent of the English word to the user dictionary. It is registered therein.

At a step S5, the user inputs the part of speech of the Japanese equivalent to the user dictionary. It is registered therein.

At a step S6, the user input the inflection of the Japanese equivalent to the user dictionary. It is registered therein. This is the last step of registering a new word in the user dictionary.

If the part of speech of the Japanese equivalent input at the step S6 is a verb, at the step S6, the conjugation (inflection) of the Japanese equivalent verb input at the step S4 is automatically presumed in light of the characters of the Japanese equivalent under the control of the translation CPU 15.

Figure 11:
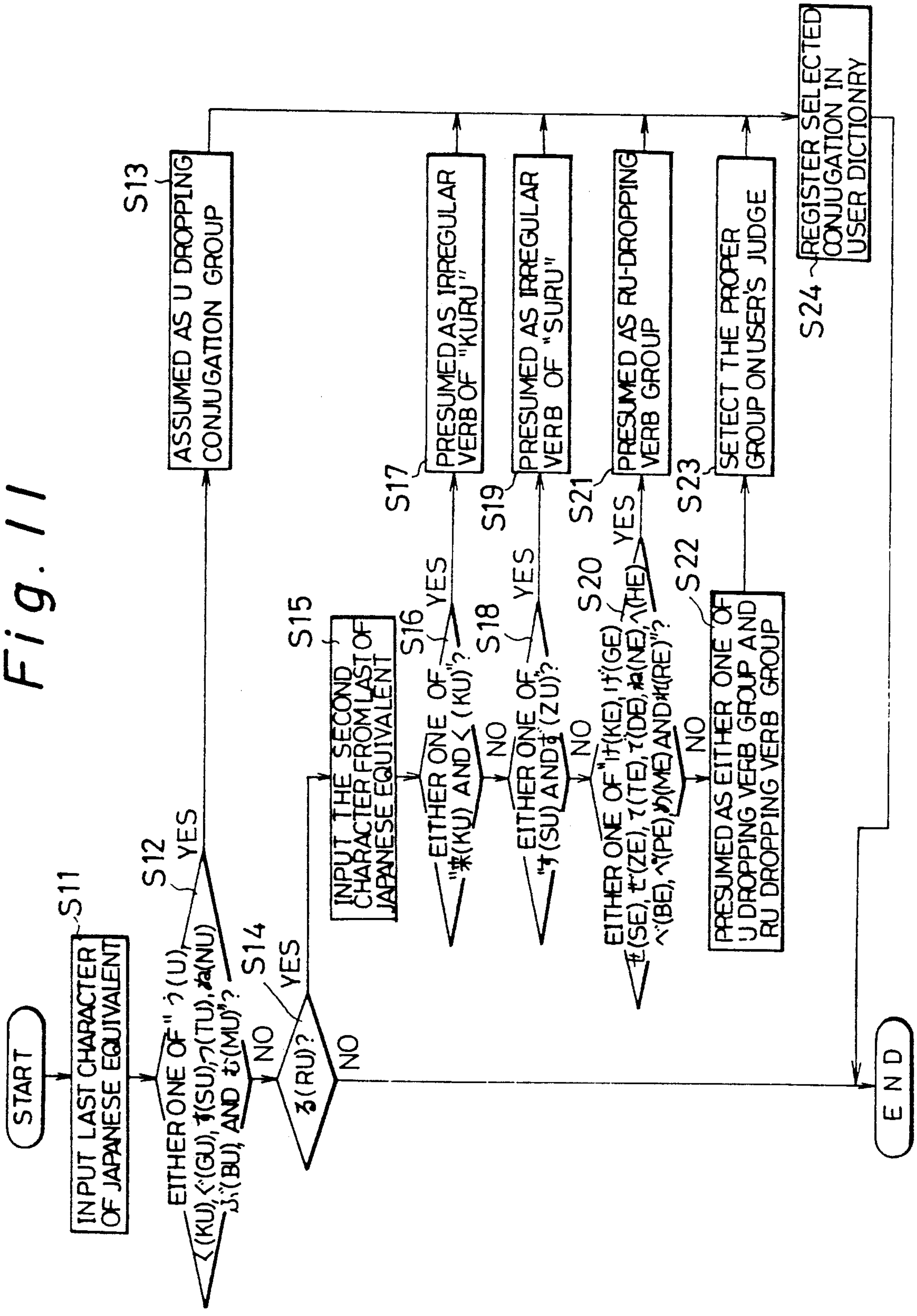
FIG. 11 is a flowchart showing how a conjugation of a translated equivalent is presumed and registered.

FIG. 11 is a flowchart showing how the conjugation of the Japanese equivalent verb is presumed and registered under the control of the translation CPU 15. How to presume the conjugation and register it will be discussed with reference to FIG. 11.

At a step S11, the translation CPU 15 causes the reading of the last character of the Japanese equivalent verb input and registered in the user dictionary at the step S4 of FIG. 10.

At a step S12, it is determined if the read last character is any one of "う(U)/く(Ku)/ぐ(Gu)/す(Su)/つ(Tu)/ぬ(Nu)/ぶ(Bu)/む(Mu)". If yes, the process goes to a step S13 and if not, to a step S14.

At the step S13, the conjugation of the registered Japanese equivalent is presumed to belong to a u-dropping verb group. The presumed result is stored in a buffer (not shown).

At the step S14, it is determined if the read last character is "る(Ru)". If yes, the process goes to a step S15 and if not, the process is terminated here.

At the step S15, the second character from the last of the Japanese equivalent verb is read and input in the program.

At a step S16, it is determined if the read character is either one of "来(Ku)" and "く(Ku)". If yes, the process goes to a step S17 and if not, to a step S18.

At the step S17, the conjugation of the registered Japanese equivalent verb is assumed to belong to an irregular conjugation verb of "来る(Kuru)". The presumed result is stored in the buffer (not shown) used at the step S13.

At the step S18, it is determined if the second character from the last of the Japanese equivalent verb is either one of "す(Su)" or "ず(Zu)". If yes, the process goes to a step S19 and if not, to a step S20.

At the step S19, the conjugation of the Japanese equivalent verb is presumed to belong to an irregular conjugation verb of "する(Suru)". The presumed result is stored in the buffer (not shown) used at the step S13.

At the step S20, it is determined if the second character from the last of the Japanese equivalent verb is any one of "け(Ke)/げ(Ge)/せ(Se)/ぜ(Ze)/て(Te)/で(De)/ね(Ne)/へ(He)/べ(Be)/ぺ(Pe)/め(Me)/れ(Re)". If yes, the process goes to a step S21 and if not to a step S22.

At the step S21, the registered Japanese equivalent is presumed to belong to a ru-dropping verb group and the presumed result is stored in the buffer used at the step S13.

At the step S22, the registered Japanese equivalent is presumed to belong to any one of the u-dropping and the ru-dropping verb group. A user is prompted to select a proper conjugation group on the CRT 3.

At the step S23, the user determines if the verb belongs to any group of the u-dropping and ru-dropping verb groups. The user-determined conjugation is stored in the buffer (not shown) used at the step S13.

At the step S24, the presumed conjugation stored in the buffer is registered in a user dictionary stored in the memory 6. Then, the Japanese equivalent conjugation presuming and registering process finishes.

The aforementioned determination of the information about a new English word to be registered and its equivalent Japanese word can be implemented only by entering the necessary data on the keyboard 4 in accordance with the indication displayed on the CRT 3. This determination is under the control of the translation CPU 15.

In registering a new word in the user dictionary used in English-to-Japanese translation, if its Japanese equivalent is a verb, the present embodiment makes it possible to automatically presume the conjugation of the verb in light of the last character or the second character from the last of the verb and register it in the user dictionary. Any user, if he or she has little knowledge about the Japanese grammar, can easily and efficiently execute the process of inputting the conjugation group of the Japanese equivalent.

The foregoing description has been concerned with how to presume and register the conjugation of a verb. However, the present invention can automatically presume and register the conjugation of any part of speech.

Further, the foregoing algorithm about how to presume the conjugation of the Japanese equivalent verb is not limited to the present embodiment.

The present invention may employ any arrangement and content of the buffers included in the translation module 5 without being limited to the above-mentioned arrangement and contents.

In addition, the present embodiment can employ another language except English as a source language.

Next, the description will be directed to a second embodiment of the invention with reference to FIGS. 12 to 15.

Figure 12:
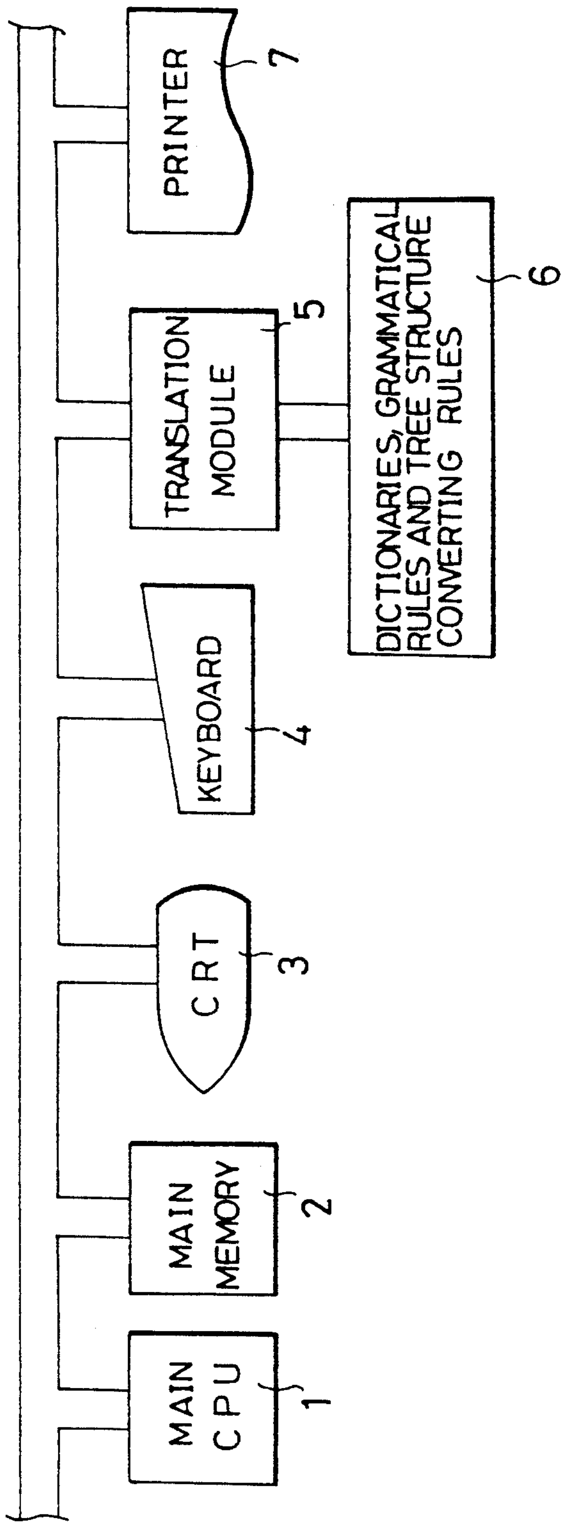
FIG. 12 is a block diagram showing arrangement of a translation machine designed according to a second embodiment of the invention.

FIG. 12 is a block diagram showing the arrangement of the translation machine designed according to the second embodiment. The comparison between FIGS. 1 and 12 indicates that the arrangement of the second embodiment is like that of the first embodiment but with the provision of a printer 7. The printer 7 is provided for printing the translated result on paper when a user determines that the result displayed on the CRT 3 is proper. The other components have the similar arrangements and functions in a similar manner as those described in the first embodiment.

The translation machine according to the second embodiment makes it possible to register a special symbol as a Japanese equivalent in the user dictionary when a new English word is registered therein. By registering the special symbol, the translation machine can output the title of the English word as its Japanese equivalent without translating it. This is a feature of the second embodiment, which will be described as follows.

Figure 13:
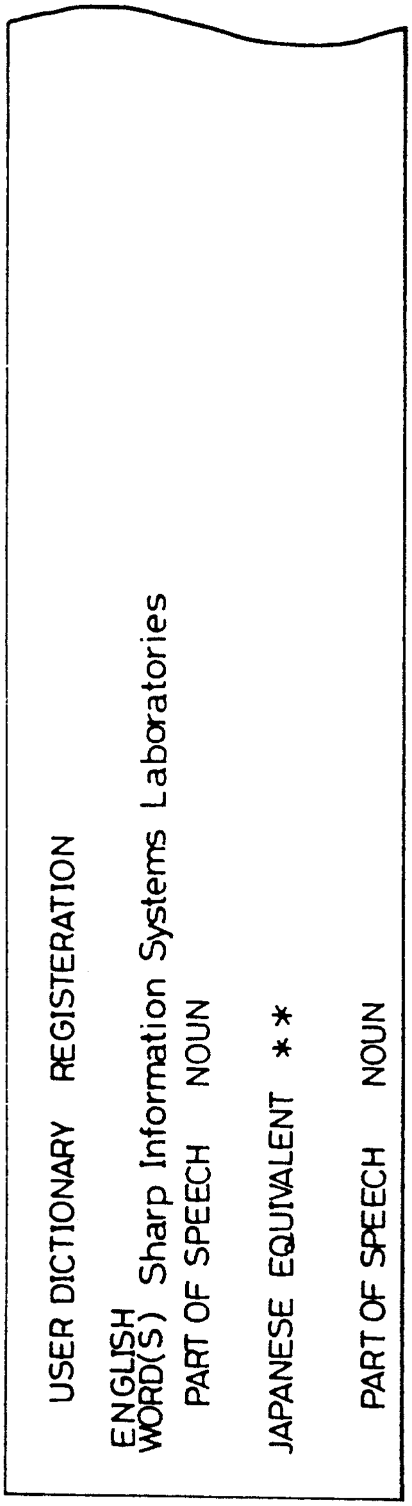
FIG. 13 is a view showing how a word is registered in a user dictionary used in the second embodiment of the invention.
Figure 14:
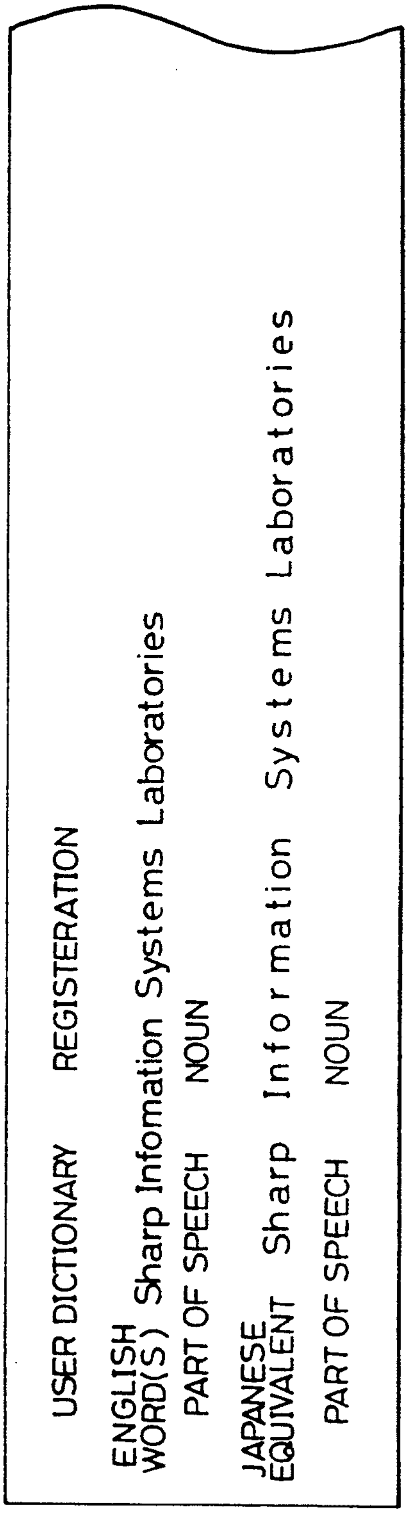
FIG. 14 is a view showing how a word is registered in a user dictionary used in a normal translation machine.

FIG. 13 shows the content of an English phrase registered in the user dictionary used in the second embodiment of the invention. FIG. 14 shows the content of an English phrase registered in the user dictionary used in the normal translation machine. For easier understanding of the description, both of these figures do not indicate the contents except the title, part of speech, Japanese equivalent of the English phrase and the part of speech of the Japanese equivalent. When the English phrase title "Sharp Information Systems Laboratories" is required to be output as its Japanese equivalent, that is, the English phrase is equal to its Japanese equivalent, as shown in FIG. 14, the normal translation machine requires an operator to input the long phrase "Sharp Information Systems Laboratories" and making sure the phrase character by character is correct for avoiding erroneous registration of the phrase. On the other hand, as shown in FIG. 13, the second embodiment can output the same one for the Japanese equivalent as the English phrase simply by registering a specific symbol "**" for the Japanese equivalent. As a result, when the English phrase "Sharp Information Systems Laboratories" is output in the Japanese translated sentence, the title of the English phrase is converted from the ASCII (American Standard Code of Information Interchange) code into the JIS (Japanese Industrial Standards) code, thereby the English phrase based on the JIS code being output as its Japanese equivalent.

Figure 15:
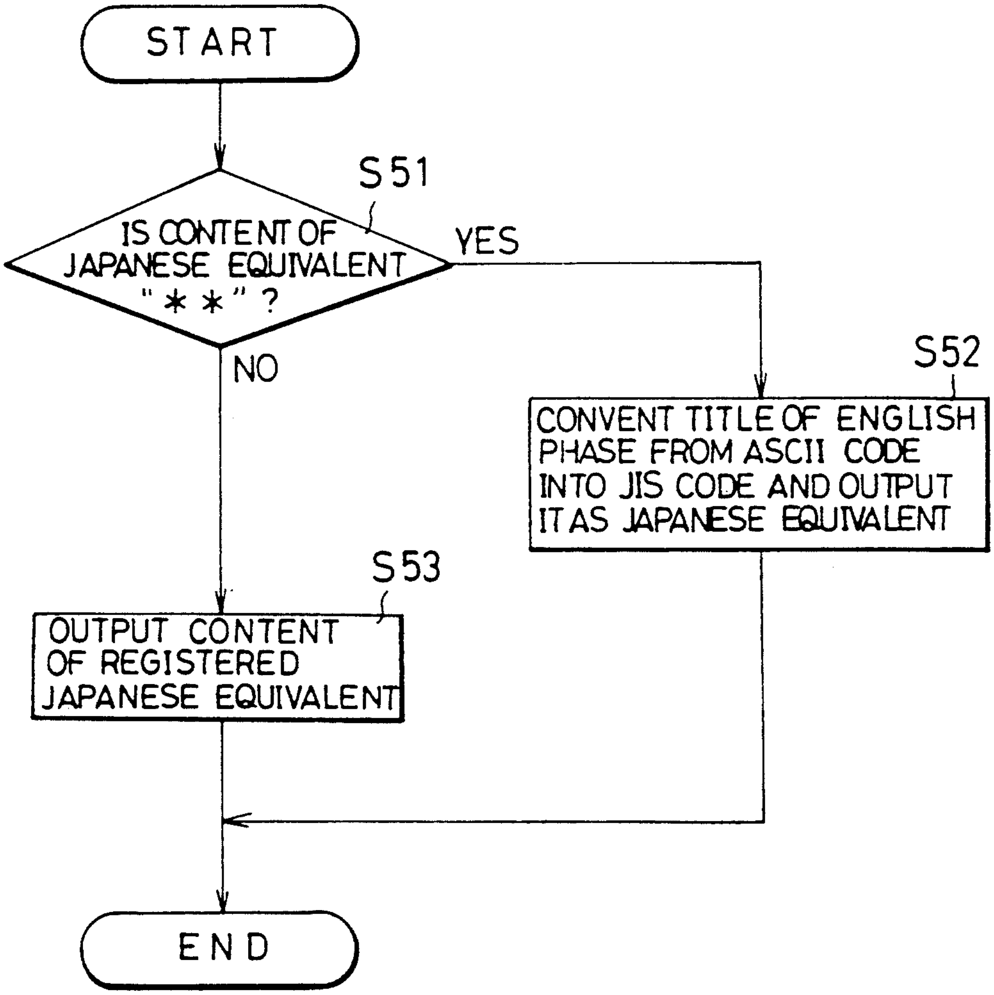
FIG. 15 is a flowchart showing how a translated equivalent assigned as a specific symbol is output in the second embodiment.

FIG. 15 is a flowchart showing how the dictionary-consulting morphologic element analyzing section 11 consults the laser dictionary for finding out a Japanese equivalent. Then, with reference to FIG. 15, the description will be directed to a process of finding out the Japanese equivalent and outputting it.

Assume that the English phrase "Sharp Information Systems Laboratories" exists in the title-of the user dictionary when the morphologic element analyzing section 11 consults the dictionary.

As a step S51, it is determined if the Japanese equivalent to the English phrase "Sharp Information Systems Laboratories" has the content of "". If yes, the process goes to a step S52 and if not, to a step S53**.

At the step S52, the English phrase title of "Sharp Information Systems Laboratories" is converted from the ASCII code to the JIS code and is output as its Japanese equivalent. Then, the process is terminated.

At the step S53, the registered Japanese equivalent to the English phrase is output without translating it. Then, the process finishes.

In this Japanese equivalent outputting operation, if the user would like to output " シャープ・インフォメーション・システムズ・ラボラトリー (matching to pronunciation of "Sharp Information System Laboratories" described in Katakana form of the Japanese Language)" as the Japanese equivalent to the English phrase "Sharp Information Systems Laboratories", it is necessary to only register " シャープ・インフォメーション・システムズ・ラボラトリー" at the Japanese equivalent item shown in FIG. 13. As a result, at the step S51 shown in FIG. 14, it is determined that the Japanese equivalent is not "". It results in allowing the morphologic element analyzing section 11 to output "シャープ・インフォメーション・システムズ・ラボラトリー " as the Japanese equivalent to the English phrase "Sharp Information Systems Laboratories" at the step S53**.

It is apparent from the above description that the present embodiment is designed to register a specific symbol "" as the Japanese equivalent to a registered English title if the user would like to output the title of the registered English word or phrase as its Japanese equivalent without translating it. If, therefore, the dictionary-consulting morphologic element analyzing section 11 retrieves in the user dictionary the English word or phrase having the specific symbol "" for its Japanese equivalent, the title of the English word or phrase is output as its Japanese equivalent without translating it.

When, therefore, registering a new English word or phrase required to have the same one for the Japanese equivalent in the user dictionary, the present embodiment makes it possible for any user to easily register it, because, as mentioned above, the user just registers the specific symbol "**" as the Japanese equivalent in stead of the overall English word or phrase.

The present embodiment employs the specific symbol of "**" though the invention may employ another symbol Further, the invention is not limited to the source language and the target language as in the embodiment which defines English and Japanese as those languages. Thus, the present embodiment does not necessarily convert the English word or phrase from the ASCII code to the JIS code when outputting the Japanese equivalent if the Japanese equivalent has the specific symbol. What is essential is to output the title of the registered word or phrase as its translated equivalent without translating it if the registered word or phrase has a specific symbol for its translated equivalent.

Figure 16:
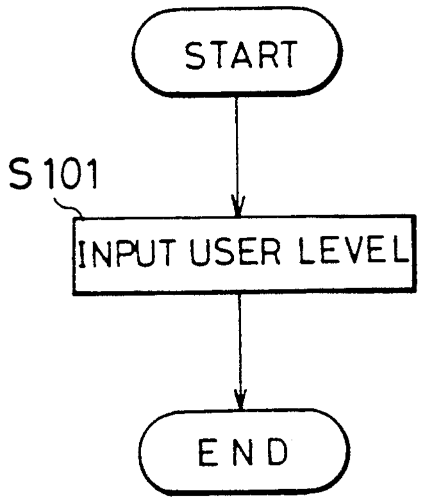
FIG. 16 is a flowchart showing how a use level is set in a third embodiment of the invention.
Figure 17:
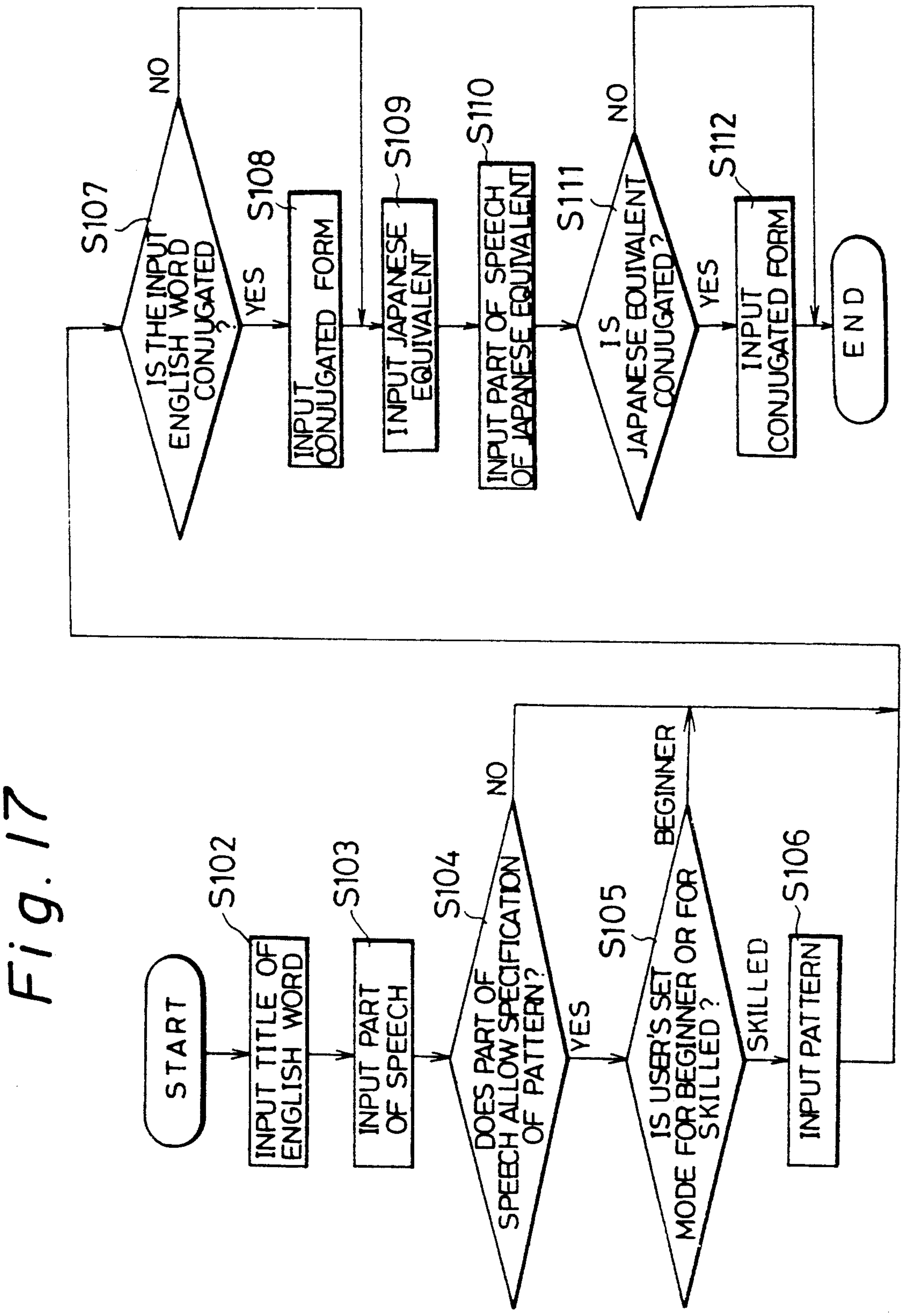
FIG. 17 is a flowchart showing how a new word is registered in a user dictionary in the third embodiment.

Next, the description will be directed to the third embodiment of the invention with reference to FIGS. 16 and 17. The arrangement of the translation machine designed according to the third embodiment is substantially same as that designed according to the first embodiment. Herein, a process of registering an English word in the user dictionary, which is the feature of the third embodiment, will be discussed.

At first, a user is required to input and set his or her level (variable) (Step S101) indicating the knowledge about the source and the target languages and the skill about the translation machine (see FIG. 16).

The user level may be arranged so that 0 matches to a beginner and 1 matches to a skilled user or several levels are located between the beginner and the skilled user.

Then, the process of registering an English word in a user dictionary will be described. For the registration, the information required for the translation includes Title of the English Word, Part of Speech of the English Word, Sentence Pattern, Inflection (Conjugation) of the English Word, Japanese Equivalent of the English word, Part of Speech of the Japanese Equivalent and Inflection (Conjugation) of the Japanese Equivalent where "Sentence Pattern" may be skipped if the user is a beginner, because for inputting the information of "Sentence Pattern", the user has to have a good knowledge about the source language, English, and the classification depending on the translation machine. Further, since it is supposed that few English words need the pattern, in particular, an English noun or adjective does not need the pattern, the lack of pattern information does not give an adverse effect to the translating process so much.

FIG. 17 is a flowchart showing a routine of registering an English word in the user dictionary.

At steps S102 and S103, the title and part of speech of an English word is input. At a step S104, it is determined if the part of speech of the English word input at the step S103 allows the pattern specification. If not, the process goes to a step S107. If yes, the process goes to a step S105 at which it is checked which mode of the user level is set, if it is a beginner mode, the process goes to the step S107. If it is a skilled-user mode, the process goes to a step S106 at which the pattern is input in a routine manner.

At the step S107, it is checked if the input English word is allowed to be conjugated. If not, the process goes to a step S109 and if yes, to a step S108 at which the conjugation of the word is input. At the step S109, the Japanese equivalent to the input English word is input. At a step S110, the part of speech of the Japanese equivalent is input.

At a step S111, it is checked if the Japanese equivalent is allowed to be conjugated. If yes, the process goes to a step S112 at which the conjugation of the Japanese equivalent is input. Then, the process is terminated.

As is apparent from the above description, when registering a new English word in the user dictionary, it is determined if the pattern information of an input word is input depending on the user's level. Hence, the skilled user can give delicate indications to the translation machine for enhancing the translation level, while the beginner can smoothly execute the registering process depending on his or her knowledge about the source and the target languages and skill about the operation of the translation machine.

The above description has concerned with the registering process in the user dictionary. However, the present embodiment concerns with the wide range of process. For example, various messages such as assurance to be output to the user may be omitted or changed depending on the set user's level.

Many widely different embodiments of the present invention may be constructed without departing from the spirit and scope of the present invention. It should be understood that the present invention is not limited to the specific embodiments described in the specification, except as defined in the appended claims.

What is claimed is:

1. A translation machine capable of translating one or more sentences described in a source language into a target language, said translation machine having a storing unit which stores dictionaries and predetermined rules, said translation machine comprising:

means for dividing a sentence described in said source language into morphologic elements so as to analyze a syntax structure of each of said morphologic elements in accordance with said dictionaries and said predetermined rules; and means connected to said dividing means for converting said syntax structure of said source language into a syntax structure of said target language so as to generate a resultant translated sentence in said target language on a basis of said syntax structure of said target language;

said dividing means including a determining means for determining whether or not a character located at a proper spot of the character series composing said target language equivalent is a pre-specified one and a presuming means for presuming the inflection of the translated word depending on the predetermined rules based on the determining result output by said determining means and for registering a presumed result in a user dictionary.

2. A translation machine according to claim 1, wherein each of said morphologic elements has an information which includes a title, a part of speech an inflection and a translated sentence equivalent to each of said morphologic elements, and a part of speech and an inflection of said translated sentence.

3. A translation machine according to claim 1, wherein said source language is English and said target language is Japanese.

4. A translation machine capable of translating one or more sentences described in a source language into a target language, said translation machine having a translation module linked with a storing unit which stores dictionaries, a user dictionary, grammatical rules and tree structure converting rules, said translation machine comprising:

means for dividing a sentence described in said source language into morphologic elements so as to obtain information of each of said morphologic elements in accordance with said dictionaries and said user dictionary;

means connected to said dividing means for analyzing a syntax structure of each of said morphologic elements obtained by said dividing means in accordance with said dictionaries and said grammatical rules;

means connected to said analyzing means for converting said syntax structure obtained by said analyzing means into a syntax structure of said target language; and means connected to said converting means for generating a translated sentence in said target language on a basis of said syntax structure of said target language obtained by said converting means, said dividing means including a means for determining whether or not a predetermined symbol is assigned to said translated sentence corresponding to a title comprising one or more of said morphologic elements in said user dictionary.

5. A translation machine according to claim 4, wherein said dividing means further includes a means for outputting said title of each of said morphologic elements as said translated sentence in a case that said predetermined symbol is assigned as said translated sentence equivalent to each of said morphological elements.

6. A translation machine according to claim 5, wherein said output means serves to output a title of said English word or phase converted into said English word or phrase on a basis of JIS code.

7. A translation machine according to claim 4, wherein said information of said each of morphologic elements obtained in said dividing means includes a title, a part of speech, an inflection and a translated sentence equivalent to each of said morphologic elements, and a part of speech and an inflection of said translated sentence.

8. A translation machine according to claim 7, wherein said source language is English and said target language is Japanese.

9. A translation machine according to claim 8, wherein said user dictionary serves to register said Japanese equivalent to English word or phrase on a basis of ASCII code having said predetermined symbol.

10. A translation machine according to claim 1, wherein said determining means determines whether the last character or the second character from the last of a said character series is a pre-specified character when said target language equivalent is a verb for registration as a new word in the user dictionary.

* * * * *